Aug. 9, 1955 G. J. PETERSON 2,714,906
ADJUSTABLE GAGING DEVICE FOR SAWS
Filed Nov. 26, 1951 4 Sheets-Sheet 1

INVENTOR
Gustaf J. Peterson
By Carlson, Pitzner, Hubbard & Wolfe
ATTORNEY

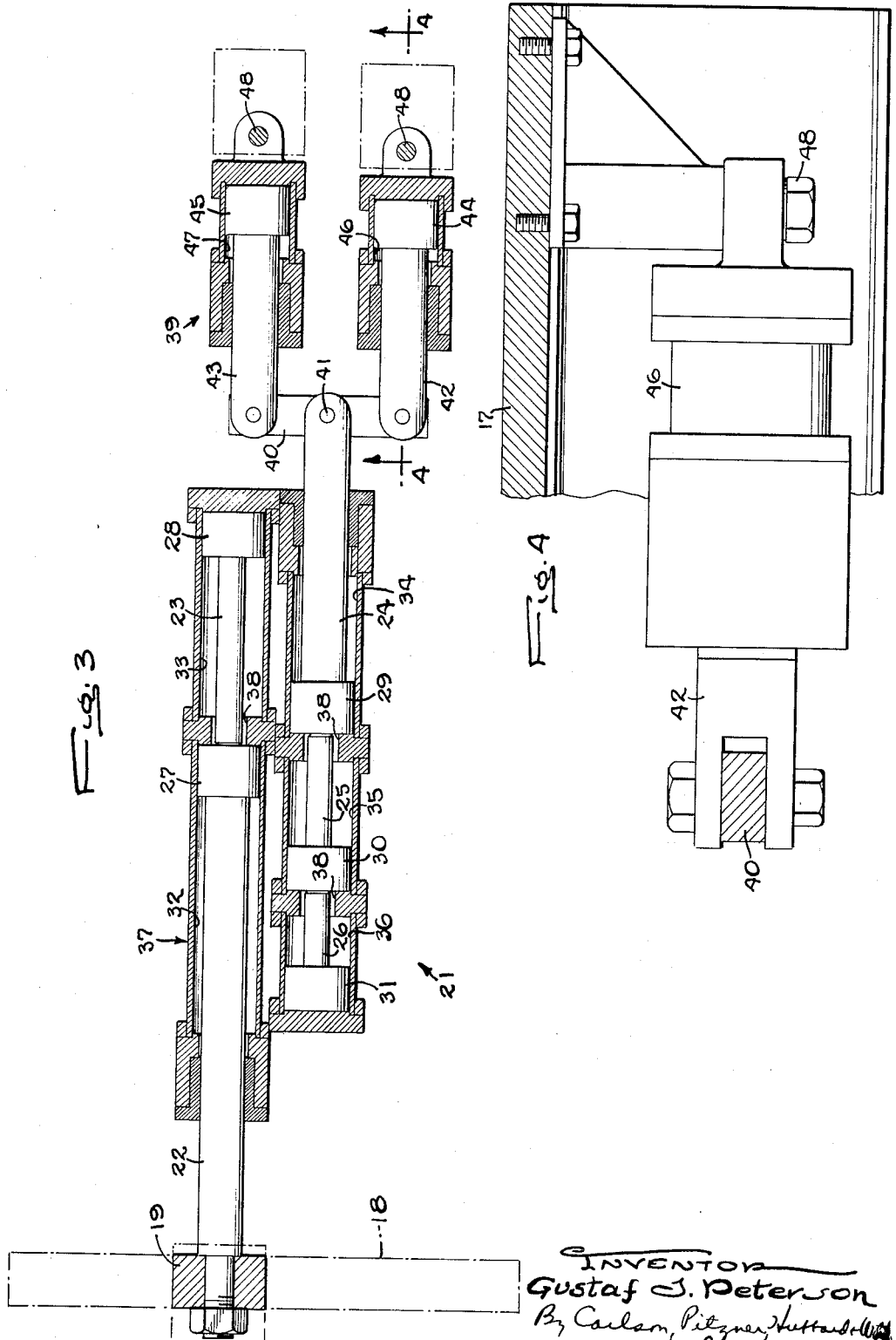

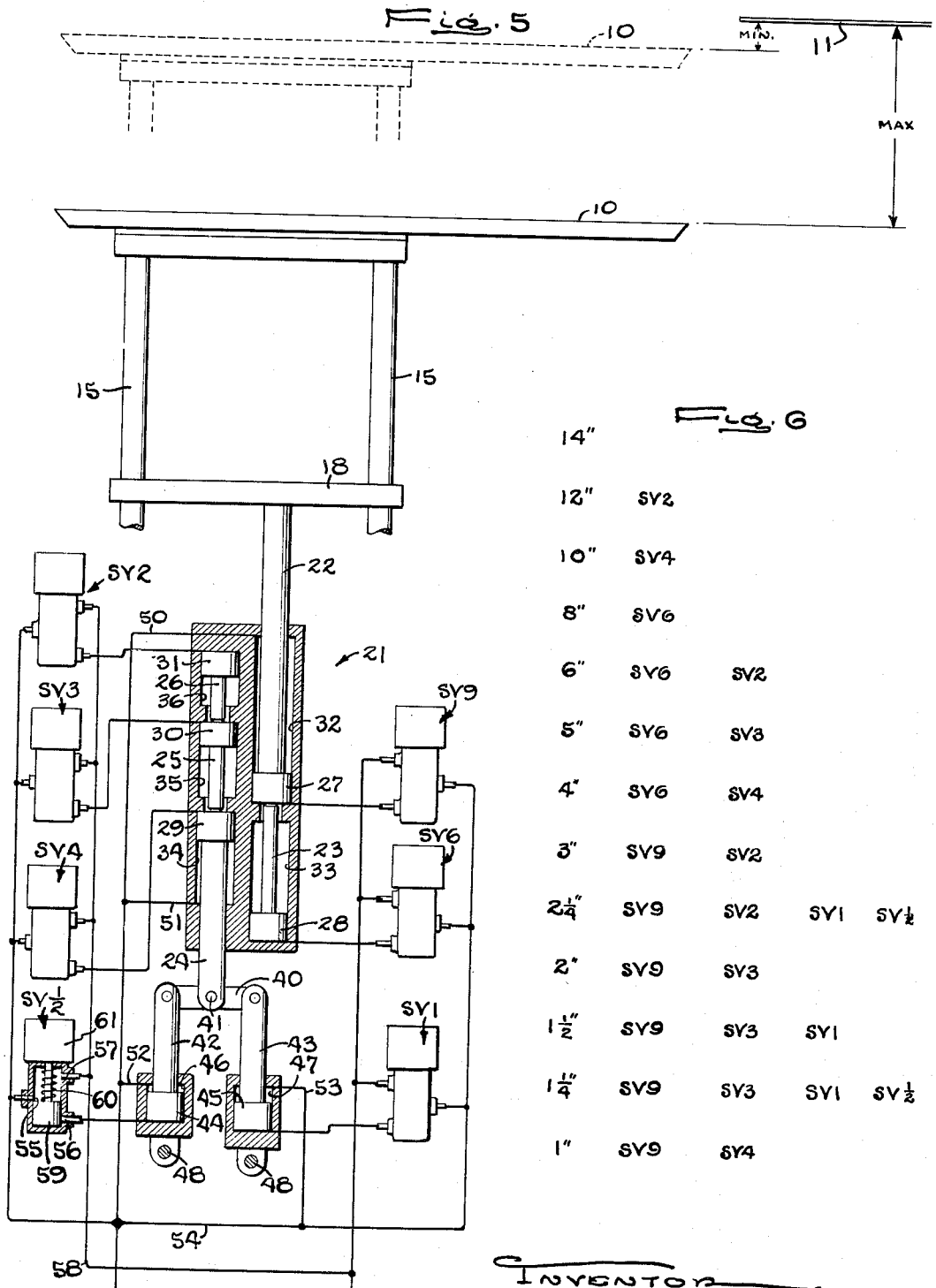

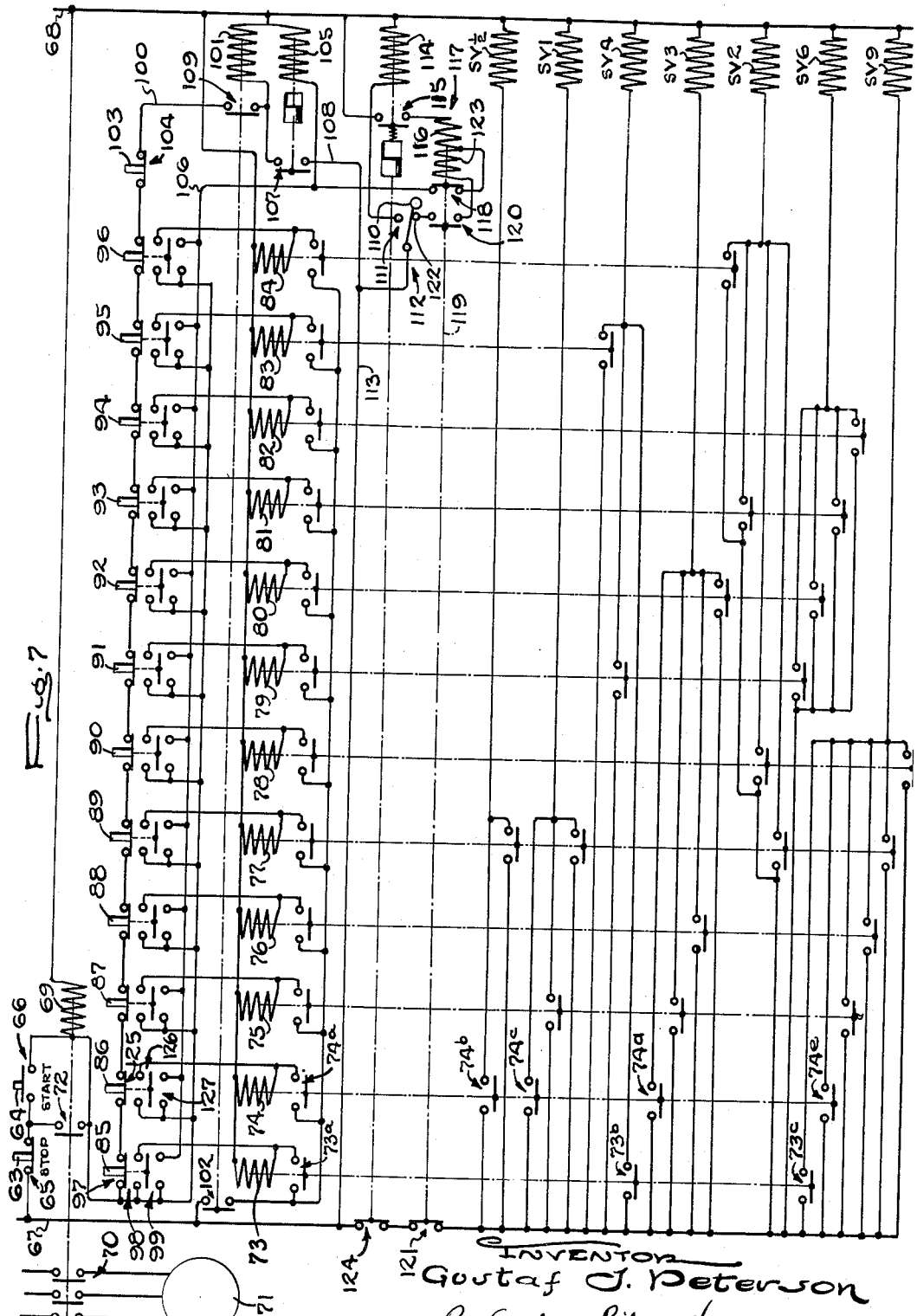

United States Patent Office 2,714,906
Patented Aug. 9, 1955

2,714,906

ADJUSTABLE GAGING DEVICE FOR SAWS

Gustaf J. Peterson, Rockford, Ill., assignor to Mattison Machine Works, Rockford, Ill., a corporation of Illinois Application November 26, 1951, Serial No. 258,159

6 Claims. (Cl. 143—174)

This invention relates to a manually controllable power actuated device to be used with a sawing machine to locate the saw and work guide of the machine relative to each other and control the width to which a workpiece is cut.

One object is to provide a fluid pressure actuated positioning mechanism embodying a novel and compact arrangement of pistons and cylinders which coact in different combinations to locate the saw and the work guide relative to each other selectively in a plurality of positions.

Another object is to provide a gage actuating mechanism in which a plurality of pistons and cylinders cooperate to vary the relative position of the saw and the work guide in a series of increments and coact with a differential mechanism to vary the position in fractions of the smallest of such increments.

A further object is to provide a new and improved device of the above character in which the relative position of the saw and work guide may be preselected during the sawing of one workpiece but will not be effective until such workpiece passes out of engagement with the saw.

Still another object is to provide such a positioning device incorporating a novel selecting system in which the control by a previous selection is broken at the same time that a new relative position of the saw and work guide is selected.

A further object is to provide a novel gage actuating mechanism which, by normally urging the work guide toward a retracted position, will automatically move the guide to a safe position in the event there is a failure of the power supplied to the controls of the actuator.

Other objects and advantages of the invention will become apparent from the following detailed description taken in connection with the accompanying drawings, in which:

Fig. 3 is a sectional view of the actuating mechanism for positioning the guide.

Fig. 4 is a sectional view taken along lines 4—4 of Fig. 3.

Fig. 5 is a diagrammatic view of the actuating mechanism shown in Fig. 3.

Fig. 6 is a chart showing the positions to which the saw guide is movable.

Fig. 7 is a wiring diagram of the control mechanism.

Figure 1:
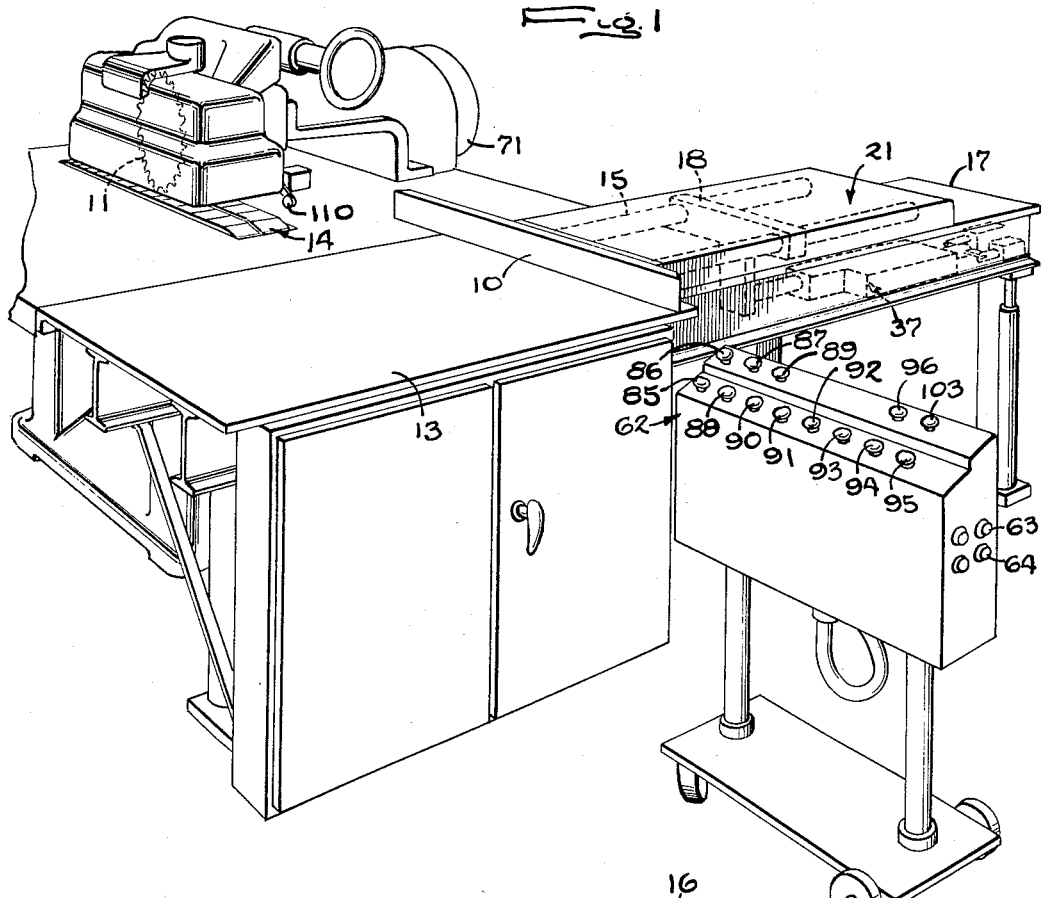
Figure 1 is a perspective view of a sawing machine embodying the novel features of this invention.
Figure 2:
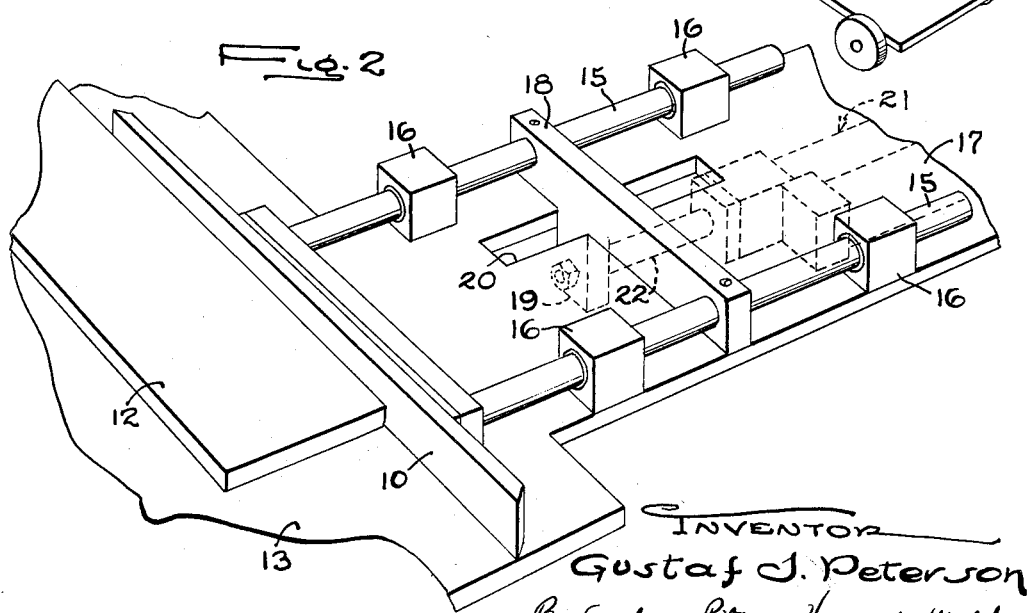
Fig. 2 is a fragmentary perspective view of a portion of the mechanism used to position the saw guide.

For purposes of illustration, the invention is shown in the drawings incorporated in a power driven sawing machine for cutting boards to selectively variable widths determined by the lateral spacing of a guide 10 from the plane of the saw 11. The board 12 to be sawed is placed on a table 13 against the guide and slid endwise into engagement with the saw whereupon it is gripped between a traveling feed belt 14 and the usual pressure roller which assume control of the board and feed the same straight past the saw.

Herein, the board width is varied by lateral adjustment of the guide 10 which comprises an elongated bar fixed to the ends of rods 15 slidable in guide blocks 16 on a lateral extension 17 of the table 13. Through a crossbar 18 rigidly connecting the rods 15 and a lug 19 depending through a slot 20 in the table extension 17, the guide 10 is adapted to be shifted to different positions by an actuating mechanism indicated generally at 21 and selectively adjustable to position the guide different predetermined distances, preferably in quarter inch increments from the plane of the saw.

The actuating mechanism comprises a plurality of driving elements 22 to 26 having individual reversible power actuators which may be energized in different combinations to shift the guide to any desired one of the available positions. Herein, the actuators comprise pistons 27 to 31 secured to one end of each rod 22 to 26 and respectively sliding in cylinders 32 to 36 formed in a bodily floating carriage 37.

To minimize the over-all length of the actuating mechanism 21 and also the number of cylinders required in order to produce a given number of positions of the guide 10, the cylinders are made of different lengths and arranged end to end in the carriage 37 in two rows 32 and 33 and 34, 35, and 36 disposed side by side. While only one piston in each row can be effective at a time, any of the pistons may be moved singly or the movements of one piston from each row may be added together to locate the guide 10. Therefore, the pistons can cooperate in different combinations whereby the number of positions of the guide considerably exceeds the number of cylinders.

In one row, the pistons 29, 30 and 31 are fast on the ends of the rods 24, 25 and 26 adjacent the guide 10 while in the other row, the pistons 27 and 28 are on the opposite ends of the rods 22 and 23 and remote from the guide. In the case of both rows, the adjacent cylinder ends communicate with each other through passages 38 through which the free end of the rod in one cylinder extends into abutment with the piston end of the rod in the adjacent cylinder, the adjacent rod ends being separable from each other. By virtue of the connecting passages 38, it will be apparent that the admission of pressure fluid to the head end of one cylinder also results in the application of an equal unit pressure to the rod end of the adjacent cylinder thus urging the piston in the latter toward the head end of its cylinder. This piston is thus maintained in a definite position until fluid at the same pressure is applied to the larger area on the head end of the piston.

To enable the actuating mechanism 21 to shift the guide in one inch increments by selective energization of the piston actuators in different combinations, the cylinders 32, 33, 34, 35 and 36 are sized to permit movement of their pistons through 9, 6, 4, 3 and 2 inches respectively.

The terminal rod 22 of one row projects through a stuffing box in the end of the carriage 37 and is connected at its outer end to the lug 19 and therefore to the guide bar 10. The rod 24 at the opposite end of the other row projects through the end of the cylinder 34 and from the end of the carriage 37 where it is connected to and supported by an auxiliary power actuator 39 adapted to be energized selectively to shift the guide 10 in fractions, for example quarter inches, of the increments produced by the main actuating mechanism 21.

The actuator 39 comprises an equalizing bar 40 pivotally connected at its center 41 to the projecting end of the piston rod 24 and at opposite ends to rods 42 and 43 carrying pistons 44 and 45 which are slidable in cylinders 46 and 47 stationarily anchored at 48 to the under side of the frame extension 17. By sizing the cylinders 46 and 47 to provide for movement of the rods 42 and 43 through ½ inch and 1 inch respectively, the pivot 41 and the carriage 37 connected thereto may, by admitting pressure fluid to the four ends of the cylinders 46 and 47 in different combinations, be shifted in quarter inch increments through a range of one inch.

Pressure fluid, preferably compressed air, from a suitable source (not shown) is supplied continuously to the rod ends of the cylinders 32 and 34 through pressure lines 50 and 51 thus urging the pistons 27 and 29 to the head end of these cylinders. Because of the abutting relation of the pistons and rods in each of the rows of cylinders, all of the pistons 27 to 31 will be shifted to the head ends of their respective cylinders as shown in Fig. 5 until pressure fluid admitted to the head ends of the cylinders 32 to 36 acts upon the larger area of the head end of the pistons. Similarly, the rod ends of the cylinders 46 and 47 are continuously connected through lines 52 and 53 to the pressure source thus urging the pistons 44 and 45 to the head ends of their cylinders.

To slide the various pistons 27 to 31, 44 and 45 to the rod ends of their cylinders, thereby positioning the guide 10, a plurality of solenoid valves SV in a line 54 from the pressure source direct fluid to the head ends of the cylinders 32 to 36, 46 and 47 there being a valve for each cylinder identified in the drawings according to the length of the stroke of the piston which it activates. For example, the valve admitting fluid pressure to the cylinder 32, the piston 27 of which has a 9 inch stroke, is designated SV9. An inlet 55 of each valve SV admits fluid pressure from the line 54 while one outlet 56 communicates with the head end of the cylinder associated with the valve and another outlet 57 returns the fluid to the exhaust line 58. To control the outlet through which the pressure fluid will be transmitted, a valve member 59 is biased by a spring 60 to close the outlet 56 leading to the cylinder and opens the outlet 57 to the exhaust line 58 while a solenoid 61 when energized overcomes the force of the spring 60 to open the outlet 56 thus moving the piston to the rod end of its cylinder.

When the solenoids of all of the valves are de-energized, all of the piston rods will be moved to an inactive position (Fig. 5) in which the guide 10 is retracted a maximum distance, shown here as 14 inches, from the plane of the saw. Should there be an electrical power failure in the energizing circuit of the solenoid valves, the guide 10 will be automatically moved away from, rather than toward, the saw 11 and thereby retracted to a safe position.

The chart of Fig. 6 shows some of the positions of the guide 10 which are obtainable with the combination of cylinders of the lengths illustrated. In this connection, it will be observed that each piston rod moves the guide 10 toward the saw 11 a distance corresponding to the stroke, or half the stroke in the case of the rods 42 and 43, of its associated piston. To determine the location of the guide relative to the saw, therefore, it is necessary to subtract the length of the stroke from the maximum position. Hence, to locate the guide 5 inches from the saw 11, solenoid valves SV6 and SV3 will be energized since the combined strokes of pistons 28 and 30 is 9 inches which, subtracted from 14 inches, leaves the desired distance of 5 inches. Similarly, by energizing valves SV9, SV3 and SV1, the guide 10 will be located 12½ inches from its fourteen inch position and 1½ inches from the saw 11. Many other positions of the guide 10 are possible, those shown in the chart producing the more conventional widths to which boards are cut.

Selective energization of the valve solenoids is effected by a control mechanism 62 which includes Stop and Start push buttons 63 and 64 to control switches 65 and 66 connected across power lines 67 and 68 through a relay 69. When the push button 64 is depressed to close the switch 66, the relay 69 closes the contacts 70 of the saw motor 71 as well as completing its own holding circuit through a switch 72. Depressing the push button 63 opens the switch 65 and breaks the holding circuit, thus deenergizing the relay 69 and opening the contacts 70 to stop the motor 71.

To energize the valves SV in different combinations, a plurality of relays 73 to 84 complete the circuits to the solenoids of the valves, the relay 73, for example, closing switches 73$^b$ and 73$^c$ to energize valves SV4 and SV9. Thus each of the relays 73 to 84 and its associated switches form a control unit to actuate a different combination of valves SV thus locating the guide 10 in one of its positions. In order that the relays 73 to 84 may be energized selectively, a plurality of manually operable selectors, or push buttons 85 to 96, one for each relay, control the circuits to the relays by opening and closing three switches, such as the switches 97, 98 and 99 operated by the push button 85. Because the switches 97, 98 and 99 are connected to the power line 67 through the Stop and Start switches 65 and 66, none of the push buttons 85 to 96 will be effective to energize the relays 73 to 84 until the saw motor 71 is running.

Since the switch 97 is in the line 100 to another relay 101, depressing one of the push buttons, such as the push button 85 which is described as an example, will initially open this switch to deenergize the relay 101 which breaks the circuit to the relays 73 to 84 through its switch 102, thus inactivating all of the valves SV and retracting the guide 10 to its 14 inch position. With this arrangement, an additional selector 103 opening and closing just one switch 104 in the line 100 to the relay 101 may be employed to locate the guide 14 inches from the plane of the saw 11.

Further depression of the push button 85 results in the switch 99 being closed thus completing a circuit to a timing relay 105 through a line 106 which in turn closes a switch 107. Thus, an independent circuit to the relay 101 is completed through a line 108 and the switch 107, the switch 102 then being closed by the relay 101 to close the circuit to the relays 73 to 84. At the same time, the switch 98 is closed by depression of the push button 85 to energize the relay 73 thus closing the switches 73$^b$ and 73$^c$ in the circuits of the valves SV4 and SV9. With the relay 73 energized, a holding circuit through the switch 102 of the relay 101 and a switch 73$^a$ closed by the relay 73 is closed to maintain the valves SV4 and SV9 actuated after the push button 85 has been released. After a short interval, for example, two or three seconds, the relay 105 opens the switch 107 breaking the independent circuit to the relay 101. During this time, the push button 85 must be released to again close the switch 97 which, since the switch 109 is closed by the relay 101, completes the circuit to the relay 101 through the line 100. The circuits controlled by the other push buttons 86 to 96 are similar to that of the push button 85, the only difference being in the combination of valves SV which are actuated.

Means is also provided to sense the presence and absence of a board in front of the guide 10 and to activate the control mechanism so that the latter moves the guide to a new position according to a previously made selection after a board being cut has passed out of the path of reciprocation of the guide. Herein this means comprises an element 110 which is positioned adjacent the saw 11 (Fig. 1) and is lifted by a board being cut to close one set of contacts 111 of a double-throw switch 112 thus completing a circuit through a line 113 and the switch 112 to another timing relay 114. The switch 115 of the relay 114 is closed instantaneously to permit the coil 116 of a double coil relay 117 to be energized when the line 106 is completed by closing one of the lower push button switches, such as 99. When the coil 116 of the relay 117 is energized, a switch 118 in the circuit to the coil 116 is opened, but a core (not shown) within the coil 116 retains a permanent magnet effect and holds the armature 119 of the relay 117 to the right, as viewed in Fig. 7, with switches 118 and 121 open and the switch 120 closed. The switch 121, being in the circuit of the switches of the relays 73 to 84, when opened prevents the actuation of the valves SV even though one of the relays 73 to 84 is energized.

When the board has passed out of the path of the guide 10, the sensing element 110 drops by gravity thus closing the other set of contacts 122 of the switch 112 and a circuit to the other coil 123 of the relay 117 is completed, the switch 120 being held closed by the core of the coil 116. Although the switch 112 now opens the circuit to the timing relay 114, this relay delays the opening of the switch 115 so that the coil 123 of the relay 117 may be energized to shift the armature 119 to the left, thus closing the switches 118 and 121 and opening the switch 120.

A switch 124 in the circuit to the switches of the relays 73 to 84 is closed when the timing relay 114 is not energized and remains closed for the period of time necessary for the longest board to travel through the saw 11 by virtue of the time delaying nature of the relay 114 although the latter be energized by the closing of the contacts 111. When the relay 114 is deenergized, however, the switch 124 closes instantaneously.

Operation

The operator starts the saw motor 71 running by pushing the button 64 and then selects a board and examines it to determine to which width it should be cut. Assuming that a 1 inch width is decided upon, the push button 85 is depressed closing the switch 99 thereby completing the energizing circuit of the timing relay 105. With the timing relay 105 energized, the independent circuit through the line 108 and the switch 107 energizes the relay 101 thus closing the switch 102 in the circuit of the relays 73 to 84. At the same time, the switch 98 is closed energizing the relay 73 and closing the switches 73$^b$ and 73$^c$ to actuate the valves SV4 and SV9. Since the holding circuit for the relay 73 is closed through the switch 73$^a$, this relay remains energized when the push button 85 is released. Although the timing relay 105 is deenergized within a few seconds thus opening the switch 107 in the independent circuit for the relay 101, the push button 85 will have been released completing the circuit through the line 100 to the relay 101 which is sealed by the switch 109.

With the valves SV4 and SV9 opened, pressure fluid is admitted to the head ends of cylinders 34 and 32 and, since the areas of the head ends of the pistons 29 and 27 are greater than the areas of the rod ends, the pressure thus applied overcomes the opposing pressure on the rod ends of the pistons. Since the piston rod 24 is held by the equalizing bar 40, the carriage 37 and the cylinder 34 slide relative to the table extension 17 moving the guide 10, 4 inches toward the plane of the saw 11. The piston 27 and its rod 22 are free and, as this piston slides to the rod end of the cylinder 32, the guide is moved an additional 9 inches toward the saw 11 thus locating the guide the desired 1 inch from the saw.

The board to be sawed is placed on the table 13 with one edge lying along and against the guide 10 and then moved into engagement with the saw 11 where the belt 14 and the pressure roll grip and feed it through the saw. While the first board is being cut, the operator examines the next board to decide the width to which it should be cut. Assuming that this is to be 1¼ inches, the push button 86 is depressed which instantly opens the switch 125 in the line 100 to the relay 101 deenergizing this relay and opening the switch 102. Thus, the relay 73 is deenergized opening the switches 73$^b$ and 73$^c$ to the valves SV4 and SV9 with the result that the fluid pressure in the lines 50 and 51 slides the pistons 27 and 29 to the rod ends of the cylinders 32 and 34 since pressure is no longer admitted to the head ends of these cylinders. Although the guide 10 is thereby retracted to its 14 inch position, the saw 11 continues to cut the first board 1 inch because the belt 14 and the pressure rollers hold the board on a straight path.

Depression of the push button 86 also closes a switch 127 again energizing the timing relay 105 to complete the independent circuit to the relay 101 thus closing the switch 102 in the circuit of the relay 74 which, at the same time, is energized by the closing of the switch 126. The switches 74$^b$, 74$^c$, 74$^d$ and 74$^e$ in the circuits of the valves SV½, SV1, SV3, and SV9 are thus closed and held in that position by virtue of the switch 74$^a$ in the holding circuit of the relay 74. Since the saw 11 is still engaging the first board, the sensing element 110 will be in its upper position closing the contacts 111 of the switch 112 to energize the timing relay 114. With the switch 115 of the timing relay 114 closed, the coil 116 of the double coil relay 117 is energized shifting the armature 119 to the right and opening the switch 121 in the circuit of the valves SV. Although the switches 74$^b$, 74$^c$, 74$^d$ and 74$^e$ are closed, therefore, the new combination of valves will not yet be actuated.

As soon as the first board has passed out of the path of the guide 10, the sensing element 110 drops to close the contacts 122 thus energizing the coil 123 of the relay 117 and shifting the armature 119 to the left. The switch 121 is thereby closed completing the circuit to the valves SV½, SV1, SV3 and SV9. The valves SV3 and SV9 admit fluid pressure to the head ends of cylinders 35 and 32 sliding the carriage 37 and moving the guide 10 in a manner similar to that in which the 1 inch position of the guide was obtained. In this case, however, the pistons 30 and 27 locate the guide 10, 2 inches from the saw 11. Since the valves SV½ and SV1 admit fluid pressure to the head ends of cylinders 46 and 47, overcoming the effect of the pressure in the rod ends supplied by lines 52 and 53, the rod 42 moves ½ inch and the rod 43 moves 1 inch. The equalizing bar 40, therefore, acting through the rod 24 slides the carriage 37 and the guide 10 an additional ¾ of an inch bringing the guide to the 1¼ inch location with respect to the saw 11. The second board is then placed on the table 13 against the guide 10 and fed into the saw 11.

During the entire operation, the switch 124 is closed, but, should no new board be supplied to the saw, the timing relay 114 will eventually open the switch 124 which is also in the circuit of the valves SV. The guide 10, therefore, will always be left in its retracted position after the last board has been cut.

It will be apparent that the saw guide as above described is easy of operation and requires a minimum of the operator's attention. Once a board is engaged by the saw 11, he may turn to the next piece to determine the size to which it can be cut. As soon as it is decided what the next size will be, the operator may depress the appropriate push button whether the previous cut has been completed or not. Each succeeding board, therefore, may be fed to the machine as soon as the preceding board disengages the sensing element 110. No time is lost between cuts in setting the guide to a new position since the guide setting for the next board is preselected during the sawing of one board and then made automatically immediately after a board has passed out of the path of the guide 10. In addition, by arranging the cylinders 32 to 36 in two rows on a slidable carriage, which is also moved in fractions of increments by the pistons 44 and 45 and the equalizing bar 40, a wide variety of positions may be obtained while keeping the size of the positioning mechanism within reasonable limits. The mechanism may thus be applied as an attachment to most conventional sawing machines. Further, the guide 10 will always retract to a safe position in the event of an electrical failure since the valves SV are biased by the spring 60 to shut off the pressure supply to the head ends of the cylinders 32 to 36, 46 and 47, thereby permitting the pressure in the lines 50, 51, 53 and 54 to force the pistons 27 to 31, 44 and 45 to the rod ends of the cylinders.

I claim as my invention:

1. In a machine for sawing workpieces to different widths, the combination of, a member movable transversely of the path of the feed of the workpiece through the saw to locate the saw and the work guide of said machine relative to each other in different transverse positions, a plurality of power driven actuating elements each movable between two positions and coacting together in different combinations to locate said member selectively in different positions, an actuator for each of said elements, a plurality of manually operable selectors, a control mechanism conditioned differentially in response to the actuation of the individual selectors and operable to activate said actuators in combinations corresponding to the actuated selector, an element responsive to the position of a workpiece being cut and movable between first and second positions to sense respectively the presence and absence of the workpiece in front of the guide, mechanism actuated by said sensing element in its first position and operable to maintain said control mechanism inactive while the workpiece is engaging the saw, and means actuated by said sensing element in its second position and operable to render said control mechanism as conditioned by a preselected one of said selectors effectual to activate a corresponding combination of said actuators to thereby position said member in accordance with a selected condition of said control mechanism.

2. In a machine for sawing workpieces to different widths, the combination of, a member movable transversely of the path of feed of the workpiece through the saw to locate the saw and the work guide of said machine relative to each other in different transverse positions, a plurality of power driven actuating elements each movable between two positions and coacting together in different combinations to locate said member selectively in different positions, an actuator for each of said elements, a plurality of manually operable selectors, a plurality of sets of control devices, one for each of said selectors, operable when rendered active to energize said actuators in different combinations, an element responsive to the position of a workpiece being cut and movable between first and second positions to sense respectively the presence and absence of the workpiece in front of the guide, mechanism actuated by said sensing element in its first position and operable to maintain said control devices inactive while the workpiece is engaging the saw, and means actuated by said sensing element in its second position and operable to render the selected set of control devices effectual to energize their associated actuators to thereby position said member in accordance with a preselected set of said devices.

3. In a machine for sawing workpieces to different widths, the combination of, a member movable transversely of the path of feed of the workpiece through the saw to locate the saw and the work guide of said machine relative to each other in different transverse positions, a plurality of power driven actuating elements each movable between two positions and coacting together in different combinations to locate said member selectively in different positions, a fluid pressure operated actuator for each of said actuating elements, a source of fluid pressure, a solenoid actuated valve for each of said actuators for connecting the latter to said source, a plurality of manually operable selectors, a plurality of sets of control devices, one for each of said selectors, operable when rendered active to energize said solenoid valves in different combinations, an element responsive to the position of a workpiece being cut and movable between first and second positions to sense respectively the presence and absence of the workpiece in front of the guide, mechanism actuated by said sensing element in its first position and operable to maintain said control devices inactive while the workpiece is engaging the saw, and means actuated by said sensing element in its second position and operable to render the selected set of control devices effectual to energize their associated solenoid valves to thereby position said member in accordance with a preselected set of said devices.

4. In a machine for sawing workpieces to different widths, the combination of, a carriage slidable along a predetermined path, a first set of cylinders mounted end to end on said carriage and forming a first row paralleling said path, a second set of cylinders mounted end to end on said carriage and forming a second row paralleling and disposed alongside said first row, said cylinders being of different lengths, pistons, one in each of said cylinders and each having a rod projecting from one end of the piston toward the adjacent piston to abut the latter, one terminal rod in each row projecting beyond said carriage, a member mounted on the terminal rod of said first row and movable therewith to locate the saw and the work guide of said machine relative to each other in different positions, means to admit fluid pressure to selected cylinders in said first row thereby to move said member a predetermined distance relative to said carriage, stationary means connected to the terminal rod of said second row, and means to admit fluid pressure to selected cylinders in said second row thereby to move said carriage and said member bodily together a predetermined distance along said path.

5. In a machine for sawing workpieces to different widths, the combination of, a member movable transversely of the path of feed of the workpiece through the saw to locate the saw and the work guide of said machine relative to each other in different transverse positions, an equalizing bar, a carriage slidable along a predetermined path, a plurality of cylinders of different lengths supported by said carriage and paralleling said predetermined path, a plurality of pistons, one for each of said cylinders, means interconnecting said carriage and said pistons and providing a floating connection of varying length joining said member and the intermediate part of said bar, said bar being pivoted to said connection, means for admitting fluid pressure to opposite ends of said cylinders selectively to shift a piston and cylinder relative to each other in different combinations to thereby adjust the length of said connection in increments, a power actuator connected to one end of said bar and movably maintaining said end in one position, said actuator when energized moving said bar end a predetermined distance to a second position, a second power actuator connected to the other end of said bar and maintaining said other end in one position, said second actuator when energized moving said other bar end a predetermined distance less than said first mentioned distance to a second position thereby to slide said carriage and move bodily therewith said cylinders, said pistons and said member in fractions of increments by selectively energizing said actuators in different combinations.

6. In a machine for sawing workpieces to different widths, the combination of, a member movable transversely of the path of feed of the workpiece through the saw to locate the saw and the work guide of said machine relative to each other in different transverse positions, a movable element spaced from said member, a carriage disposed between said member and said element and slidable along a predetermined path, a plurality of cylinders of different lengths supported by said carriage and generally paralleling said predetermined path, a plurality of pistons, one for each of said cylinders, said carriage, said cylinders and said pistons providing a floating connection of varying length joining said member and said element, means for admitting fluid pressure to opposite ends of said cylinders selectively to shift a piston and a cylinder relative to each other in different combinations to thereby adjust the length of said connection in increments, and means connected to said element and operable to move said element thereby to slide said carriage and move bodily therewith said cylinders, said pistons and said member in fractions of increments.

References Cited in the file of this patent

UNITED STATES PATENTS

| | | |
|---|---|---|
| 585,649 | Brinkman | July 6, 1897 |
| 1,316,051 | Linderman | Sept. 16, 1918 |
| 1,385,369 | Ferrier | July 26, 1921 |
| 1,561,342 | Martin | Nov. 10, 1925 |
| 1,684,033 | Josephs | Sept. 11, 1928 |
| 1,698,117 | Ashley | Jan. 8, 1929 |
| 1,795,896 | Schenck | Mar. 10, 1931 |
| 2,397,106 | Haller | Mar. 26, 1946 |
| 2,507,644 | Peters | May 16, 1950 |
| 2,530,880 | Herman | Nov. 21, 1950 |